(12) United States Patent
Rahman (10) Patent No.: US 10,880,154 B2
(45) Date of Patent: Dec. 29, 2020

(54) DISTINGUISHING BETWEEN NETWORK- AND DEVICE-BASED SOURCES OF SERVICE FAILURES

(71) Applicant: AT&T Intellectual Property I, L.P., Atlanta, GA (US)

(72) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 218 days.

(21) Appl. No.: 15/585,946

(22) Filed: May 3, 2017

(65) Prior Publication Data

US 2018/0324034 A1 Nov. 8, 2018

(51) Int. Cl.
*H04L 12/24* (2006.01)
*H04L 29/08* (2006.01)

(52) U.S. Cl.
CPC ...... *H04L 41/0677* (2013.01); *H04L 41/0631* (2013.01); *H04L 41/147* (2013.01); *H04L 41/0672* (2013.01); *H04L 67/303* (2013.01)

(58) Field of Classification Search
CPC . H04L 41/0677; H04L 67/303; H04L 41/147; H04L 41/0631; H04L 41/0672
See application file for complete search history.

(56) References Cited

U.S. PATENT DOCUMENTS

| 6,754,854 | B2 | 6/2004 | Kurrasch |
| 7,954,010 | B2 | 5/2011 | Beattie, Jr. et al. |
| 7,987,392 | B2 | 7/2011 | Boctor et al. |
| 8,036,132 | B1 | 10/2011 | Beattie, Jr. et al. |
| 8,370,369 | B2 | 2/2013 | Veres et al. |
| 8,462,619 | B2 | 6/2013 | Clemens et al. |
| 8,700,052 | B2 | 4/2014 | Modi et al. |
| 9,106,548 | B2 | 8/2015 | Johnsson et al. |
| 2002/0194047 | A1* | 12/2002 | Edinger ................ G06Q 10/06 705/7.14 |
| 2008/0263200 | A1* | 10/2008 | Or Sim .................. H04H 60/31 709/224 |
| 2009/0180393 | A1 | 7/2009 | Nakamura |
| 2013/0058221 | A1* | 3/2013 | Andersen ............ H04L 41/0631 370/242 |
| 2014/0056126 | A1* | 2/2014 | Bencheck ........... H04L 41/5012 370/228 |
| 2014/0379894 | A1* | 12/2014 | Allen .................. H04L 41/0645 709/224 |
| 2015/0186202 | A1* | 7/2015 | Wang ...................... H04L 45/04 714/57 |
| 2015/0341211 | A1* | 11/2015 | Saha ..................... H04W 24/02 709/221 |

(Continued)

*Primary Examiner* — Alina A Boutah (57) ABSTRACT

In one example, the present disclosure describes a device, computer-readable medium, and method for distinguishing between network- and device-based sources of service failures in service networks. For instance, in one example, a method includes merging a first set of data with a second set of data to produce a merged data set. The first set of data relates to a customer device connected to a service network and the second set of data relates to the service network. A failure is predicted in the delivery of a service from the service network to the customer device, based on the merged set of data. It is determined whether a source of the failure is rooted in the customer device or in the service network.

20 Claims, 3 Drawing Sheets

(56) References Cited

U.S. PATENT DOCUMENTS

2016/0164697 A1\* 6/2016 Sakata .................. G06Q 10/20
                                                                700/275
2016/0205595 A1    7/2016 Stewart et al.
2016/0323163 A1\* 11/2016 Abdulnour .............. H04L 41/16
2017/0093654 A1\*  3/2017 Mathews .............. H04L 43/045
2017/0308422 A1\* 10/2017 Golash ............... H04L 41/0631
2018/0041378 A1\*  2/2018 Yan ....................... H04W 24/04
2018/0145873 A1\*  5/2018 Beattie, Jr. ............. H04L 43/08
2018/0248745 A1\*  8/2018 Ahmed ................. G06F 11/008

\* cited by examiner

FIG. 3 ically to devices, non-transitory com-
DISTINGUISHING BETWEEN NETWORK- AND DEVICE-BASED SOURCES OF SERVICE FAILURES The present disclosure relates generally to data analytics, and relates more particularly to devices, non-transitory computer-readable media, and methods for distinguishing between network- and device-based sources of services failures in service networks.

BACKGROUND

Service network failures (e.g., interruptions and/or degradations to the services delivered by a network) can often be attributed to one or more of a variety of factors. For instance, sometimes the source of the failure is in the network. Hardware malfunctions, power losses, security breaches, and other circumstances may affect the ability of the network to reliably deliver the services. Other times, the source of the failure is the customer device to which the service is being delivered. For instance, the customer device may be running out-of-date software or may be subject to poor battery life.

SUMMARY

In one example, the present disclosure describes a device, computer-readable medium, and method for distinguishing between network- and device-based sources of service failures in service networks. For instance, in one example, a method includes merging a first set of data with a second set of data to produce a merged data set. The first set of data relates to a customer device connected to a service network and the second set of data relates to the service network. A failure is predicted in the delivery of a service from the service network to the customer device, based on the merged set of data. It is determined whether a source of the failure is rooted in the customer device or in the service network.

In another example, a device includes a processor and a computer-readable medium storing instructions which, when executed by the processor, cause the processor to perform operations. The operations include merging a first set of data with a second set of data to produce a merged data set, wherein the first set of data relates to a customer device connected to a service network and the second set of data relates to the service network, predicting a failure in the service network based on the merged set of data, and determining whether a source of the failure is rooted in the customer device or in the service network.

In another example, an apparatus includes a processor for merging a first set of data with a second set of data to produce a merged data set. The first set of data relates to a customer device connected to a service network and the second set of data relates to the service network. The processor is also for predicting a failure in a delivery of a service from the service network to the customer device, based on the merged set of data, and for determining whether a source of the failure is rooted in the customer device or in the service network. The processor is also for generating a profile for the customer device, when the source of the failure is determined to be rooted in the customer device. An output device of the apparatus is for forwarding the profile to a manufacturer of the customer device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a means for distinguishing between network- and device-based sources of service failures in service networks. As discussed above, service network failures can often be attributed to one or more of a variety of conditions. Sometimes these conditions are rooted in the network itself, and other times they are rooted in the customer devices that are receiving the services.

Examples of the present disclosure exploit customer analytics to diagnose when a detected network failure is network-based or device-based. This allows failures to be addressed more efficiently, sometimes even before the failures cause major disruptions to services. This also allows persistent device problems (e.g., problems that are common to a particular make and/or model of customer device) to be identified and corrected by manufacturers.

Figure 1:
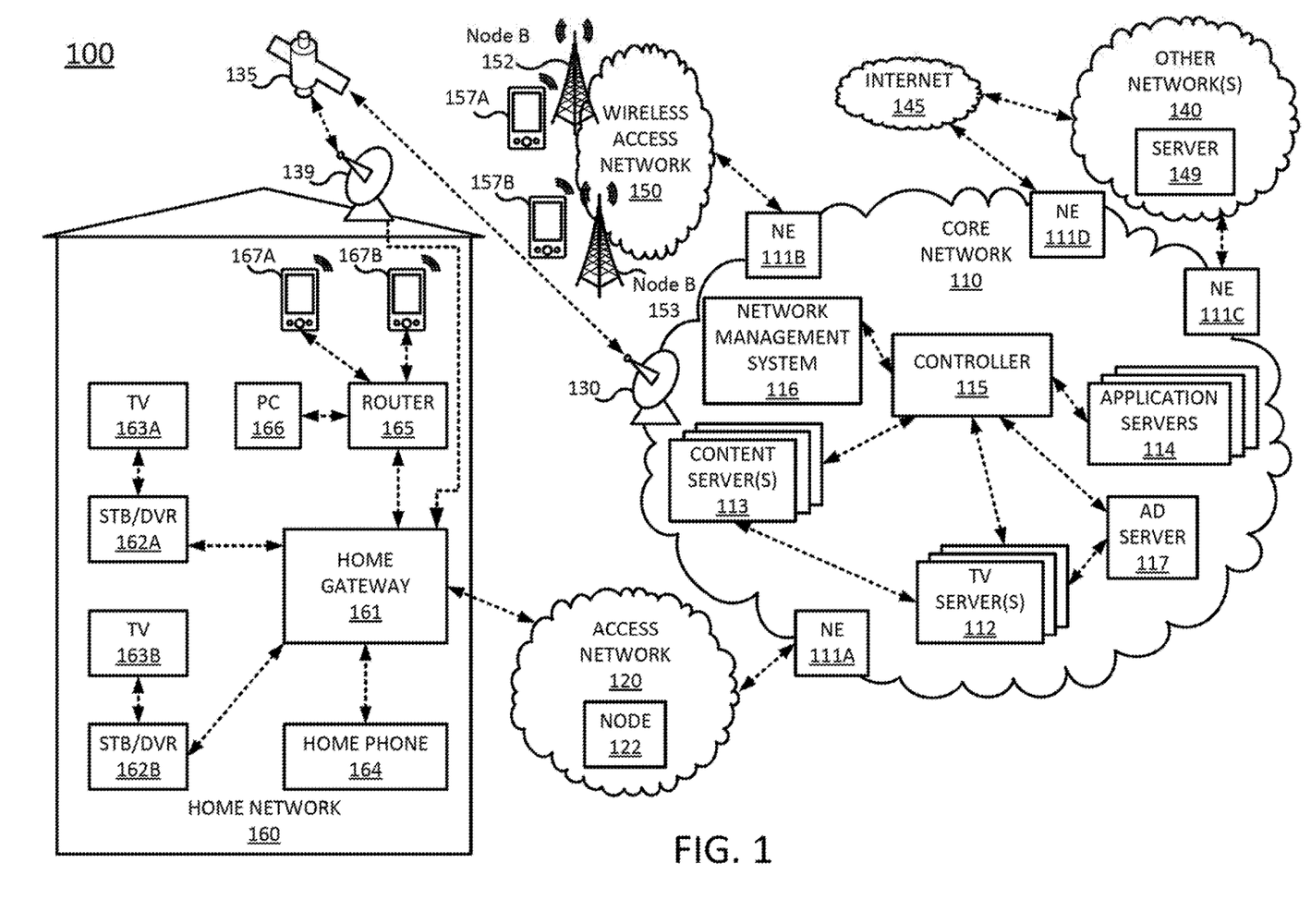
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140 and/or the Internet 145. Mobile devices 157A, 157B, 167A and 167B, and home network devices such as home gateway 161, set-top boxes (STBs) 162A, and 162B, television (TV) 163A and TV 163B, home phone 164, router 165, and personal computer (PC) 166 may also be referred to herein as "customer devices" or "user endpoint devices."

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, a central controller 115 (e.g., a software defined networking controller), and a network management system 116. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113 and advertising server 117 to select which video programs, or other content and advertisements to provide to the home network 160 and to others.

In one example, content servers 113 may store scheduled television broadcast content for a number of television channels, video-on-demand programming, local programming content, and so forth. For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160 and at other downstream viewing locations. For example, advertisers may upload various advertising content to the core network 110 to be distributed to various viewers.

In one example, the application servers 114 may include a customer analytics server that cooperates with the controller 115 to diagnose sources of service failures in the network 100. For instance, the customer analytics server may use known customer analytics techniques to synchronize and merge data from customer devices (e.g., mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166), from the core network (e.g., from network elements 111A-111D, television (TV) servers 112, content servers 113, application servers 114, advertising server (AS) 117, and network management system 116), and from other sources. The customer analytics server may be able to further determine whether a source of a network failure is a customer device or a network element, as discussed in further detail below in connection with FIG. 2.

In one example, the controller 115 is a software defined networking controller that coordinates the actions of the various elements of the network 100. The controller 115 may also be configured to take corrective action based on data from the application servers 114 (e.g., specifically from a customer analytics server) and/or from the network management system 116. In further examples still, the controller may be configured to forward (or cause another network element to forward) customer device profile data to third parties (e.g., device manufacturers and/or vendors).

In one example, the customer analytics server 114 and the controller 115 may be part of a common failure management system, rather than the customer analytics server 114 being a separate application server that communicates with the controller 115.

In one example, the network management system 116 comprises a system for recording, aggregating, and responding to reports (e.g., tickets) of failures in the network 100. These reports may come from customer devices or from other elements in the network 100. The network management system 116 may be further configured to determine appropriate corrective actions to take in response to detected failures.

Figure 3:
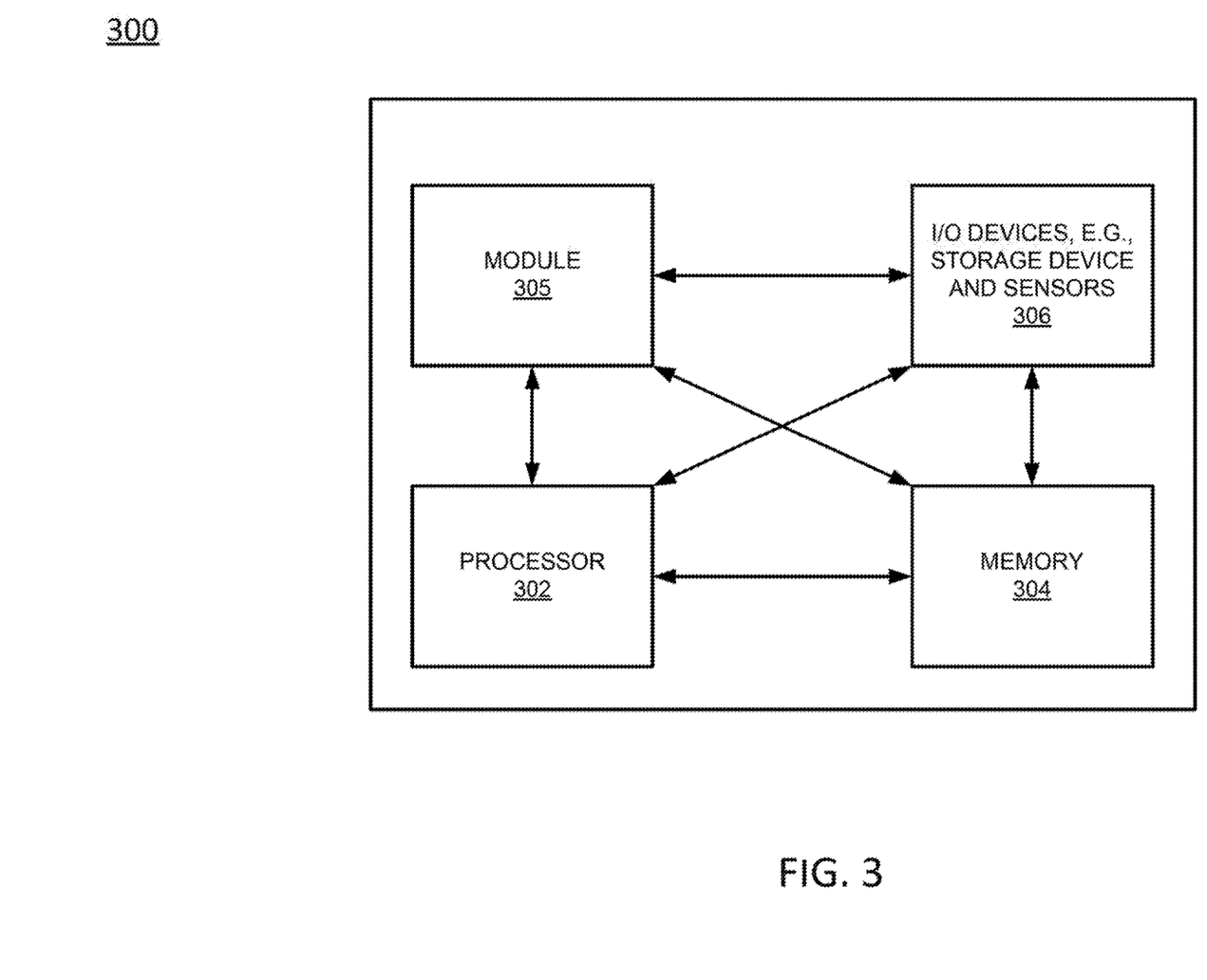
FIG. 3 depicts a high-level block diagram of a computing device specifically programmed to perform the functions described herein.

In one example, any or all of the television servers 112, content servers 113, application servers 114, controller 115, network management system 116, and advertising server 117 may comprise a computing system, such as computing system 300 depicted in FIG. 3

In one example, the access network 120 may comprise a Digital Subscriber Line (DSL) network, a broadband cable access network, a Local Area Network (LAN), a cellular or wireless access network, a 3$^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data files are forwarded to set-top boxes (STBs)/digital video recorders (DVRs) 162A and 162B to be decoded, recorded, and/or forwarded to television (TV) 163A and TV 163B for presentation or to connected home devices (CHDs) 170A and 170B for further action. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
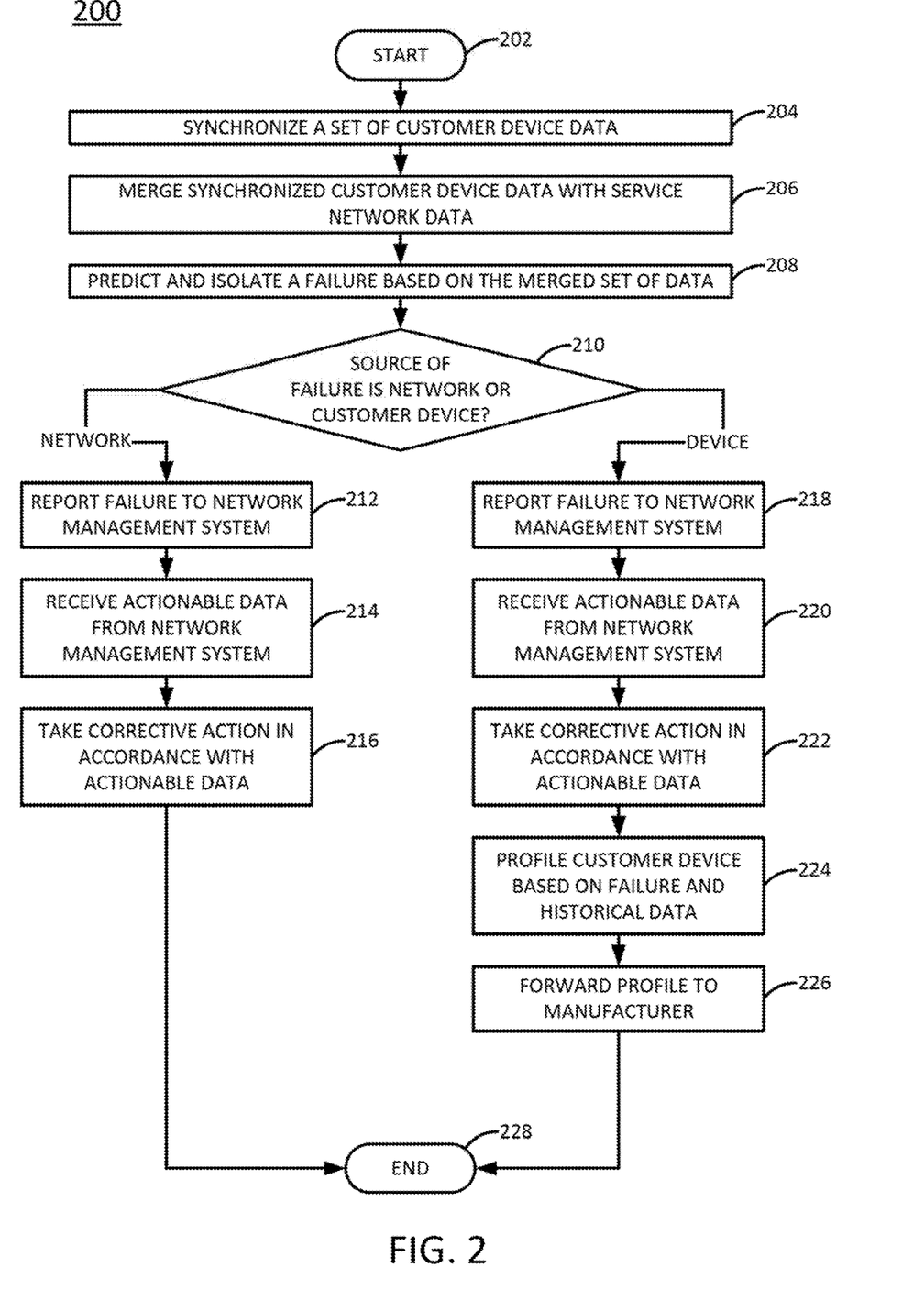
FIG. 2 illustrates a flowchart of a first example method for determining a source of a network failure.

To further aid in understanding the present disclosure, FIG. 2 illustrates a flowchart of a first example method 200 for determining a source of a network failure. In one example, the method 200 may be performed by a controller and/or customer analytics server such as the controller 115 and/or application server(s) 114 illustrated in FIG. 1. However, in other examples, the method 200 may be performed by another device (e.g., another application server). As such, any references in the discussion of the method 200 to controller 115 and/or customer analytics server/application server(s) 114 of FIG. 1 are not intended to limit the means by which the method 200 may be performed.

The method 200 begins in step 202. In step 204, a set of customer device data is synchronized (e.g., by the customer analytics server 114). The customer device data may include both user experience metrics and a set of mobile device data.

In step 206, the synchronized customer device data is merged (e.g., by the customer analytics server 114) with a set of service network data to produce a merged data set. For instance, the service network may be a mobility network or a video network. The network data may include network experience metrics, fault data, performance data (e.g., mean opinion score, real-time protocol jitter, real-time protocol packet delay, real-time protocol throughput, real-time protocol packet loss, and the like). In one example, merging of the data is performed using a customer analytics technique. Merging this data may help to detect sources of failure when the same data source is used for both mobile and non-mobile customers (e.g., satellite video data from the same server being delivered to home set-top boxes and to mobile phones). In one example, the data is merged by constructing a data structure that lists network events in a time series, where columns of the data structure identify a customer device associated with an event and rows of the data structure identify a network element associated with the event. A number of events indicating a call failure, for example, in the column associated with a particular customer device may indicate a failure that is rooted in the customer device.

In step 208, a failure in the delivery of a service from the service network to the customer device (e.g., degraded satellite-based video services, virtual machine restart in a mobility network, or relocated virtual network function in a mobility network) is predicted and isolated (e.g., by the customer analytics server 114), based on the merged set of synchronized customer service data and the network data. In one example, the prediction and isolation is performed using a customer analytics technique. For instance, the customer analytics technique may detect a hidden relationship in the merged set of data.

In step 210, it is determined (e.g., by the customer analytics server 114) whether the likely source of the failure is rooted in a network condition or a customer device condition. In one example, determination of the likely source of failure is performed using a customer analytics technique.

If the source of the failure is rooted in a network condition, then the method 200 proceeds to step 212. In step 212, the failure is reported (e.g., by the controller 115) to the network management system 116.

In step 214, actionable data is received from the network management system 116.

In step 216, a corrective action is taken (e.g., by the controller 115), in accordance with the actionable data. For instance, when the failure is rooted in a network condition, the actionable data may indicate that the controller 115 should adjust the operations of one or more network elements (e.g., a virtual machine or virtual network function) to correct for the failure. This corrective action may be carried out in substantially real-time (e.g., subject to any network latency). For instance, if content stored at a data source (e.g., server) is corrupted, a backup data source may be used to provide the same content. The method may end in step 228 after the corrective action is taken.

If, however, the source of the failure is rooted in a customer device condition, then the method 200 proceeds to step 218. In step 218, similar to step 212, the failure is reported (e.g., by the controller 115) to the network management system 116. The report may also identify (as determined, e.g., by the analytics engine) whether the source of the failure is rooted in the device's hardware or the device's software (e.g., a software application consuming a disproportionate amount of power versus a malfunctioning battery). This information may help application developers to evaluate the historical performances of their applications in connection with particular customer devices (e.g., bandwidth and/or power consumed by a particular customer device while running a particular application). This information may also help application developers, device manufacturers, and/or customers to determine when particular combinations of software running on a particular device lead to failures.

In step 220, similar to step 214, actionable data is received from the network management system 116.

In step 222, similar to step 216, a corrective action is taken (e.g., by the controller 115), in accordance with the actionable data. For instance, when the failure is rooted in a condition of the customer device, the controller 115 may notify the customer of the failure and source.

In step 224, the customer device is profiled (e.g., by the controller 115). The device profiling may be based on at least information relating to the failure identified in step 208 and on historical data relating to the customer device and similar devices (e.g., device sharing characteristics with the customer device, such as devices of the same make and/or model). For instance, information on device performance and failures going back x hours, y days, z months, or further may be used to generate a device profile that identifies any recurring problems with the device (e.g., failure statistics for different types of applications, software issues, hardware issues, battery issues, times and/or dates at which failures were observed, etc.).

In step 226, the device profile for the customer device is forwarded (e.g., by the controller 115) to the device manufacturer, device vendor, and/or service provider. The device profile may be forwarded according to a predefined schedule (e.g., provide current device profile data every d days). The device profile may also be stored, e.g., in the core network.

The method 200 ends in step 228.

By using customer analytics to merge customer device data and service network data, sources of failure when the same data source is used for both mobile and non-mobile customers may be detected more easily. For instance, satellite video data from the same server could be delivered to home set-top boxes and to mobile phones. The video quality of the satellite video data may be noticeably degraded on a mobile phone, but the degraded video quality may not have been detected by the network management element. In this case, early detection of the degraded video quality may allow the failure to be fixed before it affects a significant number of customers (since the source of the data to all customers is the same).

Examples of the present disclosure may also reduce the number of false and duplicate customer and network support tickets.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, an application server or controller (such as might be used to perform the method 200) could be implemented as illustrated in FIG. 3.

As depicted in FIG. 3, the system 300 comprises a hardware processor element 302, a memory 304, a module 305 for identifying a source of a service failure, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for identifying a source of a service failure may include circuitry and/or logic for performing special purpose functions relating to the tracking and constructing an individual user's mobility patterns (e.g., repeating patterns of behavior with respect to mobility). The input/output devices 306 may include, for example, a camera, a video camera, storage devices (including but not limited to, a tape drive, a floppy drive, a hard disk drive or a compact disk drive), a receiver, a transmitter, a display, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for identifying a source of a service failure (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for identifying a source of a service failure (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
    merging, by a processing system including at least one processor, a first set of data with a second set of data to produce a merged data set, wherein the first set of data relates to a customer device connected to a service network and the second set of data relates to the service network, wherein the second set of data comprises performance data for the service network, wherein the service network comprises at least one of: a television service network, an internet service provider network, a telephone service network, or a cellular service network;
    predicting, by the processing system, a failure in a delivery of a service from the service network to the customer device, based on the merged set of data;
    determining, by the processing system, whether a source of the failure is rooted in the customer device or in the service network; and
    generating, by the processing system, a profile for the customer device, when the source of the failure is determined to be rooted in the customer device, wherein the profile is based on at least data relating to the failure and historical data relating to the customer device and devices sharing characteristics with the customer device, wherein the devices sharing characteristics with the customer device are of a same make and model as the customer device.

2. The method of claim 1, wherein the first set of data comprises user experience metrics.

3. The method of claim 1, wherein the second set of data further comprises experience metrics for the service network.

4. The method of claim 1, wherein the second set of data further comprises fault data.

5. The method of claim 1, wherein a customer analytics technique is used to perform the merging, the predicting, and the determining.

6. The method of claim 1, further comprising:
    reporting the failure to a network management system of the service network;
    receiving actionable data from the network management system in response to the reporting; and
    taking a corrective action in accordance with the actionable data.

7. The method of claim 1, wherein the profile identifies a recurring problem with the customer device.

8. The method of claim 1, further comprising:
    forwarding the profile to a manufacturer of the customer device.

9. The method of claim 8, wherein the forwarding is performed according to a predefined schedule.

10. A device, comprising:
    a processor; and
    a computer-readable medium storing instructions which, when executed by the processor, cause the processor to perform operations, the operations comprising:
        merging a first set of data with a second set of data to produce a merged data set, wherein the first set of data relates to a customer device connected to a service network and the second set of data relates to the service network, wherein the second set of data comprises performance data for the service network, wherein the service network comprises at least one of: a television service network, an internet service provider network, a telephone service network, or a cellular service network;
        predicting a failure in a delivery of a service from the service network to the customer device, based on the merged set of data;
        determining whether a source of the failure is rooted in the customer device or in the service network; and
        generating a profile for the customer device, when the source of the failure is determined to be rooted in the customer device, wherein the profile is based on at least data relating to the failure and historical data relating to the customer device and devices sharing characteristics with the customer device, wherein the devices sharing characteristics with the customer device are of a same make and model as the customer device.

11. The device of claim 10, wherein a customer analytics technique is used to perform the merging, the predicting, and the determining.

12. The device of claim 10, wherein the operations further comprise:
   reporting the failure to a network management system of the service network;
   receiving actionable data from the network management system in response to the reporting; and
   taking a corrective action in accordance with the actionable data.

13. The device of claim 10, wherein the operations further comprise:
   forwarding the profile to a manufacturer of the customer device.

14. The device of claim 10, wherein the first set of data comprises user experience metrics.

15. The device of claim 10, wherein the second set of data further comprises experience metrics for the service network.

16. The device of claim 10, wherein the second set of data further comprises fault data.

17. The device of claim 10, wherein the profile identifies a recurring problem with the customer device.

18. An apparatus, comprising:
   a processor for merging a first set of data with a second set of data to produce a merged data set, wherein the first set of data relates to a customer device connected to a service network and the second set of data relates to the service network, wherein the second set of data comprises performance data for the service network, wherein the service network comprises at least one of: a television service network, an internet service provider network, a telephone service network, or a cellular service network, for predicting a failure in a delivery of a service from the service network to the customer device, based on the merged set of data, for determining whether a source of the failure is rooted in the customer device or in the service network, and for generating a profile for the customer device, when the source of the failure is determined to be rooted in the customer device, wherein the profile is based on at least data relating to the failure and historical data relating to the customer device and devices sharing characteristics with the customer device, wherein the devices sharing characteristics with the customer device are of a same make and model as the customer device; and
   an output device for forwarding the profile to a manufacturer of the customer device.

19. The apparatus of claim 18, wherein a customer analytics technique is used to perform the merging, the predicting, and the determining.

20. The apparatus of claim 18, wherein the operation further comprise:
   reporting the failure to a network management system of the service network;
   receiving actionable data from the network management system in response to the reporting; and
   taking a corrective action in accordance with the actionable data.

* * * * *